United States Patent
Kim et al.

(10) Patent No.: US 9,964,696 B2
(45) Date of Patent: *May 8, 2018

(54) LIGHTING MODULE

(71) Applicant: LG INNOTEK CO., LTD., Seoul (KR)

(72) Inventors: Han Gyoul Kim, Seoul (KR); Young Kuk Kwak, Seoul (KR); Sang Jun Hong, Seoul (KR); Young Sik Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 314 days.

This patent is subject to a terminal disclaimer.

(21) Appl. No.: 14/685,874

(22) Filed: Apr. 14, 2015

(65) Prior Publication Data

US 2016/0334569 A1 Nov. 17, 2016

Related U.S. Application Data

(63) Continuation of application No. 13/958,224, filed on Aug. 2, 2013, now Pat. No. 9,028,127, which is a
(Continued)

(30) Foreign Application Priority Data

May 27, 2011 (KR) .................. 10-2011-0050544
May 27, 2011 (KR) .................. 10-2011-0050545

(51) Int. Cl.
*F21V 7/04* (2006.01)
*F21V 8/00* (2006.01)

(52) U.S. Cl.
CPC ......... *G02B 6/0091* (2013.01); *G02B 6/0026* (2013.01); *G02B 6/0058* (2013.01);
(Continued)

(58) Field of Classification Search
CPC .. G02B 6/0091; G02B 6/0026; G02B 6/0058; G02B 6/0063
(Continued)

(56) References Cited

U.S. PATENT DOCUMENTS 7,525,531 B2    4/2009  Ogiwara et al.
9,028,127 B2 *  5/2015  Kim ................. G02B 6/0058
                                                     362/606
(Continued)

FOREIGN PATENT DOCUMENTS

CN    100559066 C    11/2009
CN    101922633 A    12/2010
(Continued)

OTHER PUBLICATIONS

Chinese Office Action for application No. 201210039151.9 dated Apr. 3, 2015.
(Continued)

*Primary Examiner* — Elmito Breval
*Assistant Examiner* — Meghan Ulanday
(74) *Attorney, Agent, or Firm* — Birch, Stewart, Kolasch & Birch, LLP

(57) ABSTRACT

A lighting module comprises: a light guide plate comprising a top surface and a bottom surface, wherein the light guide plate is configured to emit a first light upward from the top surface and a second light downward from the bottom surface; a first case covering an one side of the light guide plate; a second case covering an other side of the light guide plate; a first light source which is disposed in the first case and is configured to emit light to the one side of the light guide plate; and a second light source which is disposed in the second case and is configured to emit light to the other side of the light guide plate.

20 Claims, 11 Drawing Sheets

Related U.S. Application Data continuation of application No. 13/330,065, filed on Dec. 19, 2011, now Pat. No. 8,529,115.

(52) U.S. Cl.
CPC ............ *G02B 6/0063* (2013.01); *G02B 6/004* (2013.01); *G02B 6/0036* (2013.01)

(58) Field of Classification Search
USPC ............... 362/606, 608, 611, 613, 615, 616; 40/546, 572
See application file for complete search history.

(56) References Cited

U.S. PATENT DOCUMENTS

| | | |
|---|---|---|
| 2002/0064037 A1 | 5/2002 | Lee |
| 2006/0268537 A1 | 11/2006 | Kurihara et al. |
| 2010/0027293 A1 | 2/2010 | Li |
| 2011/0090422 A1 | 4/2011 | Hamada |
| 2011/0090426 A1 | 4/2011 | Choi et al. |
| 2012/0020108 A1 | 1/2012 | Chang |

FOREIGN PATENT DOCUMENTS

| | | |
|---|---|---|
| EP | 2372225 A1 | 10/2011 |
| KR | 10-2006-0119137 A | 11/2006 |
| KR | 10-2011-0042574 A | 4/2011 |
| WO | 2010082377 A1 | 7/2010 |
| WO | 2011074365 A1 | 6/2011 |

OTHER PUBLICATIONS

European Search Report for 11193129.1 dated Apr. 5, 2012.
European Examination Report for 11193129.1 dated Nov. 15, 2013.

\* cited by examiner

LIGHTING MODULE

CROSS-REFERENCE TO RELATED APPLICATION

This application is a Continuation of application Ser. No. 13/958,224 filed Aug. 2, 2013, which is a Continuation of application Ser. No. 13/330,065 filed Dec. 19, 2011, which claims priority from Korean Application No. 10-2011-0050544 filed May 27, 2011, No. 10-2011-0050545 filed May 27, 2011, the subject matters of which are incorporated herein by reference.

BACKGROUND

1. Field

Embodiments may relate to a lighting module.

2. Background

A light emitting diode (LED) is an energy device for converting electric energy into light energy. Compared with an electric bulb, the LED has higher conversion efficiency, lower power consumption and a longer life span. As there advantages are widely known, more and more attentions are now paid to a lighting apparatus using the LED.

The lighting apparatus using the LED are generally classified into a direct lighting apparatus and an indirect lighting apparatus. The direct lighting apparatus emits light emitted from the LED without changing the path of the light. The indirect lighting apparatus emits light emitted from the LED by changing the path of the light through reflecting means and so on. Compared with the direct lighting apparatus, the indirect lighting apparatus mitigates to some degree the intensified light emitted from the LED and protects the eyes of users.

SUMMARY

One embodiment is a lighting module. The lighting module comprises a light guide plate comprising a top surface and a bottom surface, wherein the light guide plate is configured to emit a first light upward from the top surface and a second light downward from the bottom surface; a first case covering an one side of the light guide plate; a second case covering an other side of the light guide plate; a first light source which is disposed in the first case and is configured to emit light to the one side of the light guide plate; and a second light source which is disposed in the second case and is configured to emit light to the other side of the light guide plate, wherein the first light passes through a first opening disposed on the top surface of the light guide plate and disposed between the first case and the second case, wherein the second light passes through a second opening disposed under the bottom surface of the light guide plate and disposed between the first case and the second case, and wherein a size of the first opening is different from a size of the second opening.

Another embodiment is a lighting module. The lighting module comprises a light guide plate including a top surface and a bottom surface, both of which are configured to emit light; a case covering one side of the light guide plate; and a light source which is disposed in the case and includes a substrate and a light emitting device disposed on the substrate, wherein the case comprises a base on which the substrate is disposed and a first and second extension parts which extend from both ends of the base respectively, wherein the first extension part is disposed under the bottom surface of the light guide plate and the second extension part is disposed on the top surface of the light guide plate, wherein a length of the first extension part is different from a length of the second extension part, and wherein the lighting module is configured to emit a first light upward from the top surface of the light guide plate, and a second light downward from the bottom surface of the light guide plate.

Another embodiment is a lighting module. The lighting module comprises a light guide plate comprising a top surface and a bottom surface, wherein the light guide plate is configured to emit the first light upward from the top surface and a second light downward from the bottom surface; a case covering at least a parts of the top surface and the bottom surface of the light guide plate; and a light source which is disposed in the case and is configured to emit light to the both sides of the light guide plate, wherein the lighting module is configured to emit a first light upward from the top surface of the light guide plate, and a second light downward from the bottom surface of the light guide plate, and wherein an outside exposure area of the top surface of the light guide plate is different from an outside exposure area of the bottom surface of the light guide plate.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
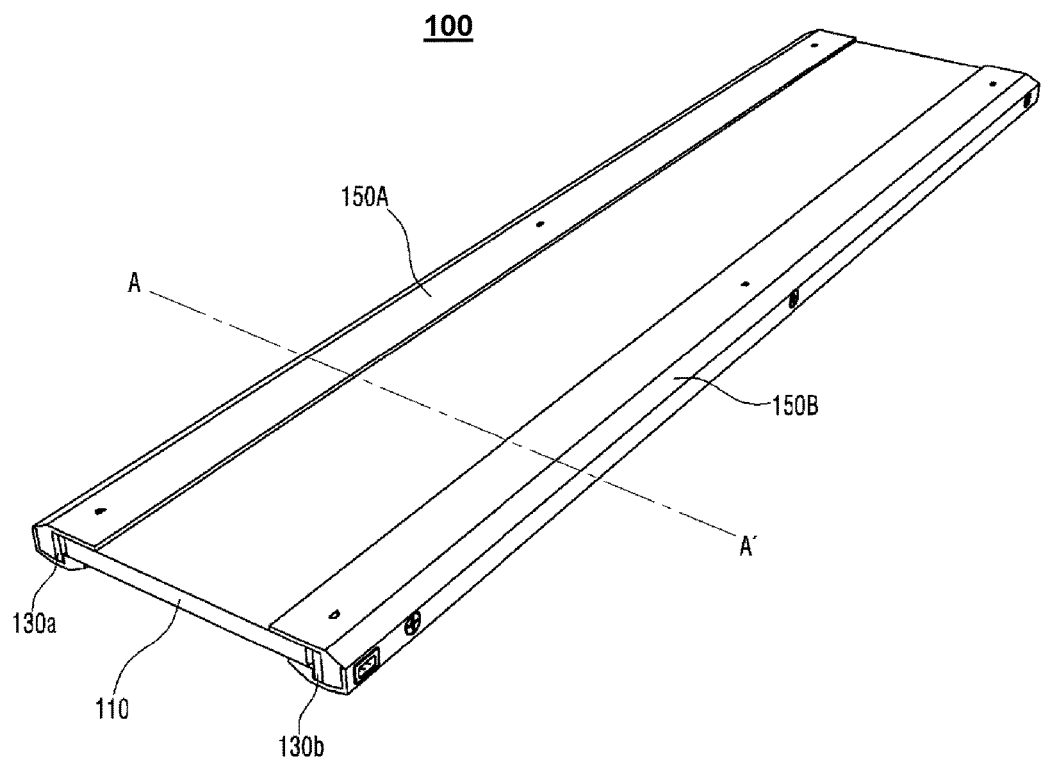
FIG. 1 is a perspective view of a lighting module according to an embodiment.
Figure 2:
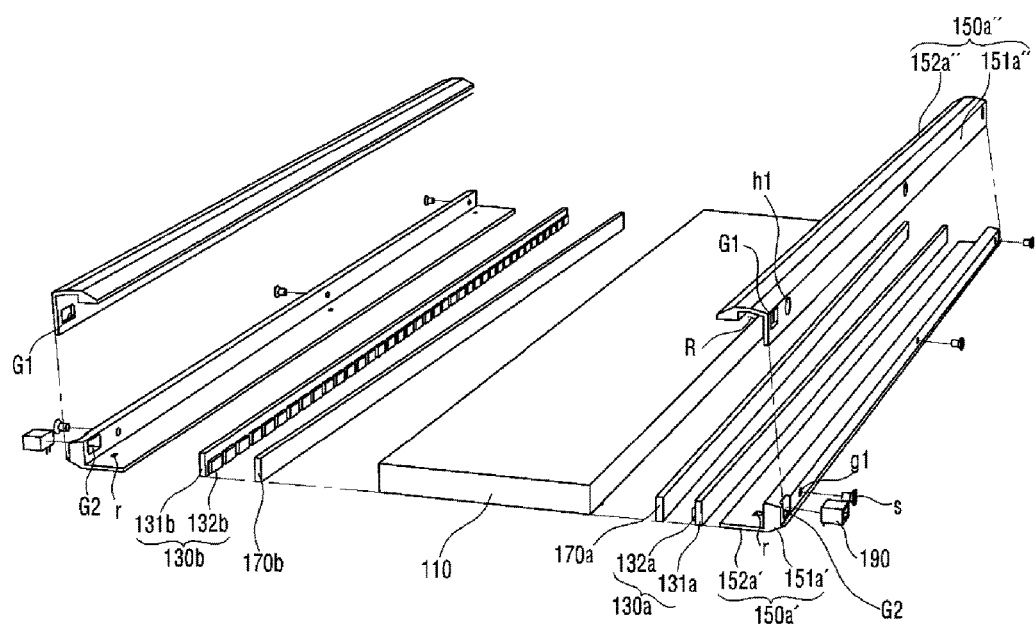
FIG. 2 is an exploded perspective view of the lighting module shown in FIG. 1.

FIG. 1 is a perspective view of a lighting module according to an embodiment. FIG. 2 is an exploded perspective view of the lighting module shown in FIG. 1.

Referring to FIGS. 1 to 2, a lighting module 100 includes a light guide plate 110, a first light source 130a, a second light source 130b, a first case 150A and a second case 150B.

The first case 150A receives the first light source 130a and covers one side of the light guide plate 110. The second case 150B receives the second light source 130b and covers the other side of the light guide plate 110. Since the second case 150B is the same as the first case 150A, a description of the second case 150B is replaced by a description of the first case 150A.

The first case 150A includes a lower case 150a' and an upper case 150a". The lower case 150a' and the upper case 150a" may be coupled to each other by a plurality of screws "S".

The lower case 150a' includes a base 151a' and an extension part 152a'. The first light source 130a is disposed on the inner surface of the base 151a'. The extension part 152a' extends from one side edge of the inner surface of the base 151a' in a direction perpendicular to the inner surface.

The upper case 150a" includes a base 151a" and an extension part 152a". The base 151a' of the lower case 150a' is disposed on the inner surface of the base 151a". The extension part 152a" extends from one side edge of the inner surface of the base 151a" in a direction perpendicular to the inner surface.

The base 151a' of the lower case 150a' may include a recess "g1". The base 151a" of the upper case 150a" may include a hole "h1". The hole "h1" is disposed at a position corresponding to the recess "g1". When the lower case 150a' is coupled to the upper case 150a", the screw "S" passes through the hole "h1" and is inserted into the recess "g1". As a result, the base 151a' of the lower case 150a' is coupled close to the base 151a" of the upper case 150a". The base 151a' of the lower case 150a' includes the recess "g1" instead of the hole in order that the first light source 130a is prevented from being damaged or broken by the screw "S" and from being electrically contacted with the screw "S".

The base 151a' of the lower case 150a' includes a second opening G2. The base 151a" of the upper case 150a" includes a first opening G1. The second opening G2 of the lower case 150a' is disposed at a position corresponding to the first opening G1 of the upper case 150a". Specifically, the second opening G2 and the first opening G1 may be disposed on one side of the first light source 130a. A driving driver 190 is disposed in the second opening G2 of the lower case 150a' and the first opening G1 of the upper case 150a". The driving driver 190 is electrically connected with the first light source 130a and supplies the first light source 130a with electric power from the outside. The driving driver 190 controls the on/off of the first light source 130a.

Though not shown in the drawings, the extension part 152a' of the lower case 150a' may include a recess into which one side of a substrate 131a of the first light source 130a is inserted. The extension part 152a" of the upper case 150a" may include a recess into which the other side of the substrate 131a of the first light source 130a is inserted. Therefore, the first light source 130a can be stably coupled to the first case 150A.

Here, a length of the extension part 152a" of the upper case 150a" may be different from that of the extension part 152a' of the lower case 150a'. For example, the length of the extension part 152a" of the upper case 150a" may be less than that of the extension part 152a' of the lower case 150a'.

The extension part 152a' of the lower case 150a' may include a receiving recess "r". This will be described with reference to FIG. 3.

Figure 3:
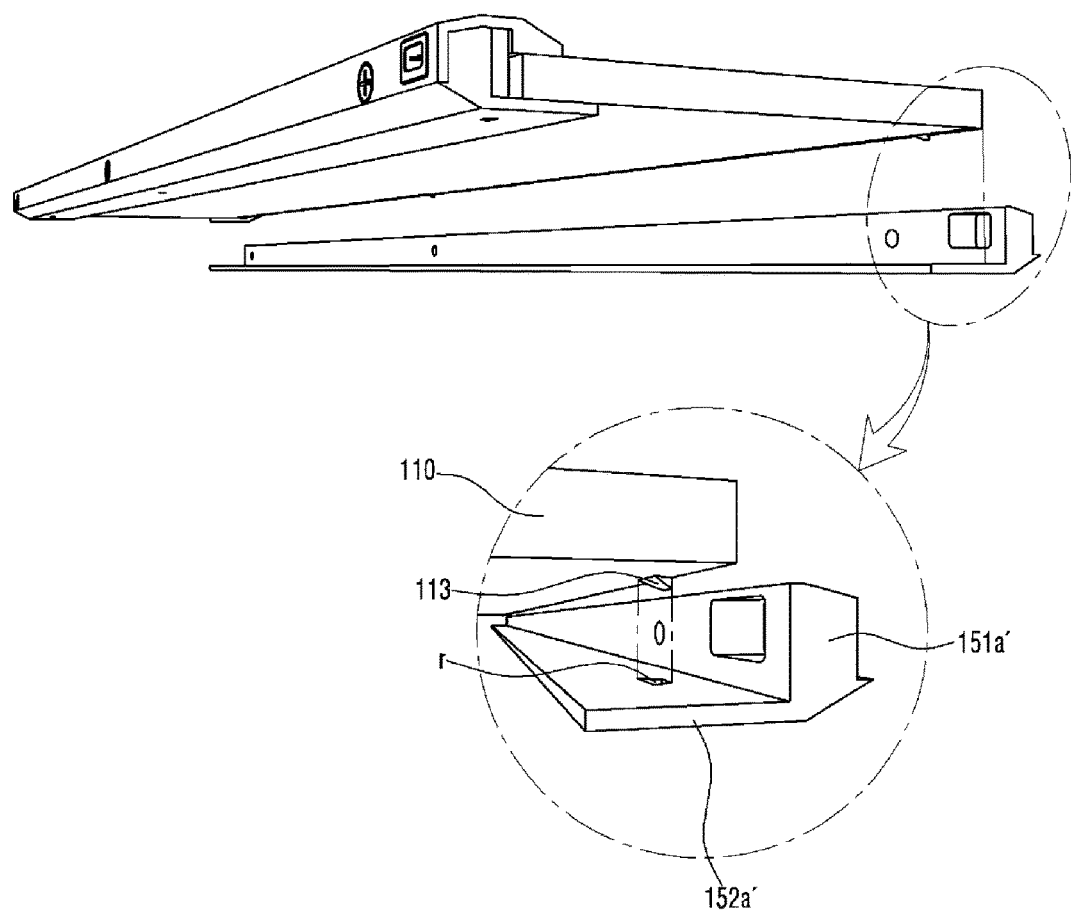
FIG. 3 is an exploded perspective view for describing how the first case shown in FIG. 2 is coupled to the light guide plate shown in FIG. 2.

FIG. 3 is an exploded perspective view for describing how the first case shown in FIG. 2 is coupled to the light guide plate shown in FIG. 2.

Referring to FIG. 3, a projection 113 formed on one side of the light guide plate 110 is inserted into the receiving recess "r". Due to the coupling of the receiving recess "r" and the projection 113, a coupling force between the extension part 152a' of the lower case 150a' and the light guide plate 110 can be strengthened and the light guide plate 110 can be prevented from moving or separating.

Referring back to FIGS. 1 to 2, the base 151a' and the extension part 152a' of the lower case 150a' may be independently formed respectively. The lower case 150a' may be also formed by coupling the base 151a' and the extension part 152a'. The base 151a" and the extension part 152a" of the upper case 150a" may be also independently formed respectively. The upper case 150a" may be also formed by coupling the base 151a" and the extension part 152a".

When the first light source 130a is disposed on the inner surface of the base 151a" of the upper case 150a", the extension part 152a' of the lower case 150a' and the extension part 152a" of the upper case 150a" support both sides of the substrate 131a of the first light source 130a respectively.

The upper case 150a" may include a receiving portion "R". The receiving portion "R" receives one side of the first light source 130a and one side of the base 151a' of the lower case 150a'.

The first light source 130a is received in the first case 150A. Specifically, the first light source 130a is disposed on the inner surface of the base 151a' of the lower case 150a' of the first case 150A.

The first light source 130a includes the substrate 131a and a light emitting device 132a.

A plurality of the light emitting devices 132a are disposed on one surface the substrate 131a. Here, the plurality of the light emitting devices 132a may be disposed in a row or in a plurality of rows.

The other surface of the substrate 131a is disposed on the inner surface of the base 151a' of the lower case 150a' of the first case 150A.

The one side of the substrate 131a is supported by the extension part 152a' of the lower case 150a' of the first case 150A. The other side of the substrate 131a is supported by the extension part 152a" of the upper case 150a" of the first case 150A. Here, the other side of the substrate 131a may be disposed in the receiving portion "R" of the upper case 150a" of the first case 150A.

The substrate 131a may be a printed circuit board (PCB), a metal core PCB (MCPCB), a flexible PCB (FPCB) or a ceramic substrate or the like.

A plurality of the light emitting devices 132a may emit lights having the same color or may emit lights having mutually different colors. When the plurality of the light emitting devices 132a emit lights the mutually different colors, the lighting module according to the embodiment can emit light having various colors. Accordingly, the lighting module according to the embodiment can create emotional lighting.

The light emitting device 132a may be a blue light emitting device. However, light emitting device 132a may be a white light emitting device having a high color rendering index (CRI), if possible. A synthetic resin including a fluorescent material is molded on a blue light emitting chip, so that the white light emitting device emits white light.

Here, the fluorescent material may include at least one of a garnet based fluorescent material (YAG, TAG), a silicate based fluorescent material, a nitride based fluorescent material and an oxynitride based fluorescent material. While the light emitting device 132a may be formed to emit natural light (white light) by causing the synthetic resins to include only a yellow fluorescent material, the light emitting device 132a may further include a green fluorescent material or a red fluorescent material in order to improve the color rendering index and to reduce the color temperature. When various kinds of the fluorescent materials are mixed in the synthetic resin, the addition ratio of the colors of the fluorescent materials is based on the fact that it is recommended that the green fluorescent material is more used than the red fluorescent material, and the yellow fluorescent material is more used than the green fluorescent material. The yellow fluorescent material may include YAG of the garnet based fluorescent material, a silicate based fluorescent material and an oxynitride based fluorescent material. The red fluorescent material may include a silicate based fluorescent material and an oxynitride based fluorescent material. The red fluorescent material may include a nitride based fluorescent material. The synthetic resin may be mixed with various kinds of the fluorescent materials or may be configured by a layer including the red fluorescent material, a layer including the green fluorescent material and a layer including the yellow fluorescent material, which are formed separately from each other.

The second light source 130b includes a substrate 131b and a light emitting device 132b. Since the substrate 131b and the light emitting device 132b of the second light source 130b are the same as the substrate 131a and the light emitting device 132a of the first light source 130a, detailed description thereof will be omitted.

The first light source 130a and the second light source 130b are disposed opposite to each other with the light guide plate 110 placed therebetween. The first light source 130a is disposed above one side of the light guide plate 110. The second light source 130b is disposed above the other side of the light guide plate 110.

The light emitting device 132a of the first light source 130a and the light emitting device 132b of the second light source 130b may have mutually different color temperatures. For example, a plurality of the light emitting devices 132a of the first light source 130a may be warm white LEDs and a plurality of the light emitting devices 132b of the second light source 130b may be cool white LEDs. The warm white LED and the cool white LED emit white light. Since the warm white LED and the cool white LED emit correlated color temperatures respectively and can emit mixed white light, a color rendering index (CRI) which represents how close light is to natural sunlight is improved. As a result, it is possible to prevent an actual color of an object from being distorted and to reduce the fatigue of the eyes of users.

The light guide plate 110 is disposed between the first light source 130a and the second light source 130b both of which are disposed corresponding to each other. Specifically, one side of the light guide plate 110 is disposed above the first light source 130a. The other side opposite to the one side of the light guide plate 110 is disposed above the second light source 130b.

The light guide plate 110 receives light through the both sides thereof and emits the light through a top surface thereof and a bottom surface thereof. As such, the light guide plate 110 guides light and changes the path of the light.

The one side of the light guide plate 110 is inserted into the first case 150A. The other side of the light guide plate 110 is inserted into the second case 150B. The one side and the other side of the light guide plate 110 include a portion of the top and the bottom surfaces of the light guide plate 110.

In the top and the bottom surfaces of the light guide plate 110, light is emitted from remaining portions other than portions inserted into the first and the second cases 150A and 150B.

The material of the of the light guide plate 110 may be polyethylene terephthlate (PET), poly carbonate (PC), cycloolefin copolymer (COC) and polyethylene naphthalate (PEN) and an acrylic resin like polymethyl metaacrylate (PMMA) and the like in consideration of thermal expansion depending on a temperature in use of the material.

The light guide plate 110 may include a predetermined pattern. The predetermined pattern may be disposed within the light guide plate 110. Various examples will be described in detail with reference to FIGS. 4 to 8.

Figure 4:
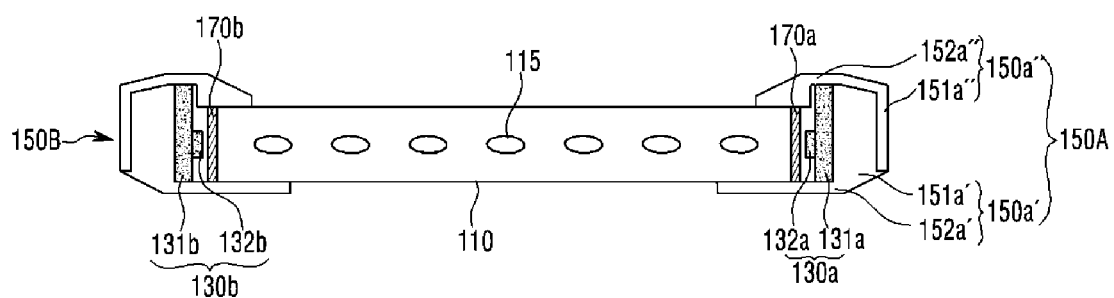
FIG. 4 is cross sectional view showing a first embodiment of the light guide plate of the lighting module shown in FIG. 1.

FIG. 4 is cross sectional view showing a first embodiment of the light guide plate of the lighting module shown in FIG. 1.

Referring to FIG. 4, the light guide plate 110 includes a predetermined pattern 115 therewithin.

The predetermined pattern 115 may be formed within the light guide plate 110 by using a laser processing method. The predetermined pattern 115 may have a shape with an empty interior.

The predetermined pattern 115 changes the path of light from the first light source 130a and the second light source 130b and allows the light to be emitted through the top and the bottom surfaces of the light guide plate 110.

A plurality of the predetermined patterns 115 may be provided.

The plurality of the predetermined patterns 115 may have the same type and may be disposed within the light guide plate 110 in a row. Particularly, the plurality of the predetermined patterns 115 may be disposed in an inner central portion of the light guide plate 110 in a row. In this case, the light from the first light source 130*a* and the second light source 130*b* may be emitted through the top and the bottom surfaces of the light guide plate 110 at the same ratio.

The plurality of the patterns 115 may be disposed closer to one of the top and the bottom surfaces of the light guide plate 110. When the plurality of the patterns 115 are disposed closer to one of the top and the bottom surfaces, an amount of the light which is emitted through the top surface of the light guide plate 110 may be different from an amount of the light which is emitted through the bottom surface. Therefore, it is possible to cause the amounts of the lights which are emitted through the top and the bottom surfaces of the light guide plate 110 to be different from each other.

The cross section of the predetermined pattern 115 may have an elliptical shape. Moreover, as shown in FIGS. 5 to 7, the predetermined pattern 115 may have various shapes.

Figure 5:
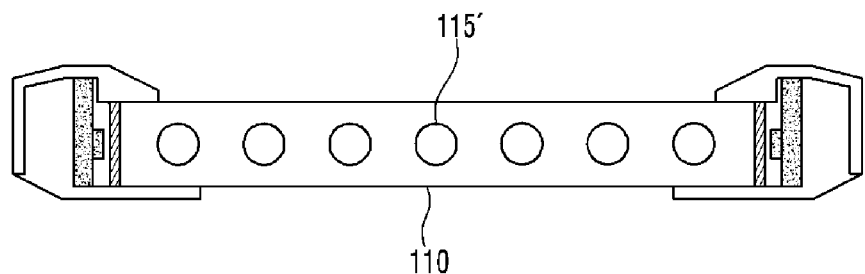
FIG. 5 is a cross sectional view showing a second embodiment of the light guide plate.
Figure 6:
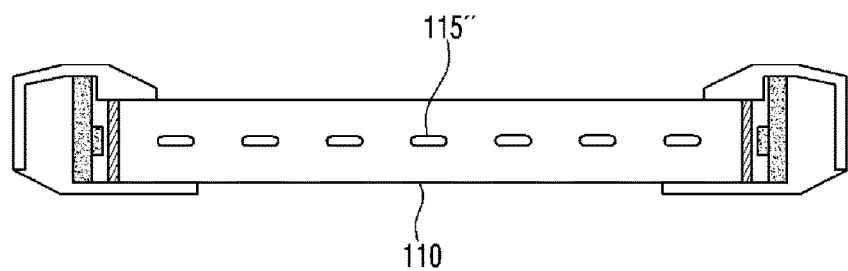
FIG. 6 is a cross sectional view showing a third embodiment of the light guide plate.

FIG. 5 is a cross sectional view showing a second embodiment of the light guide plate. FIG. 6 is a cross sectional view showing a third embodiment of the light guide plate. FIG. 7 is a cross sectional view showing a fourth embodiment of the light guide plate.

As shown in FIG. 5, the cross section of a pattern 115' of the light guide plate 110 may have a circular shape. As shown in FIG. 6, the cross section of a pattern 115" of the light guide plate 110 may have a slot shape.

Figure 7:
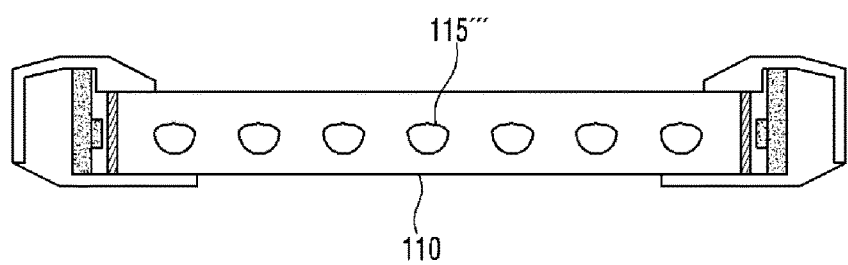
FIG. 7 is a cross sectional view showing a fourth embodiment of the light guide plate.

Also, as shown in FIG. 7, the cross section of a pattern 115''' of the light guide plate 110 may have a shape formed through a combination of a circle and an ellipse. That is, the upper portion of the shape may be elliptical and the lower portion of the shape may be circular. Here, the upper portion of the predetermined pattern 115''' may be circular and the lower portion of the predetermined pattern 115''' may be elliptical. It is possible to cause the amounts of the lights which are emitted through the top and the bottom surfaces of the light guide plate 110 to be different from each other through the predetermined pattern 115''''.

Referring back to FIG. 4, an interval between the predetermined patterns 115 may be regular. In other words, a density of the pattern 115 may be constant within the light guide plate 110.

Additionally, the interval between the predetermined patterns 115 may not be regular. That is, the density of the pattern 115 may not be constant within the light guide plate 110. This will be described with reference to FIG. 8.

Figure 8:
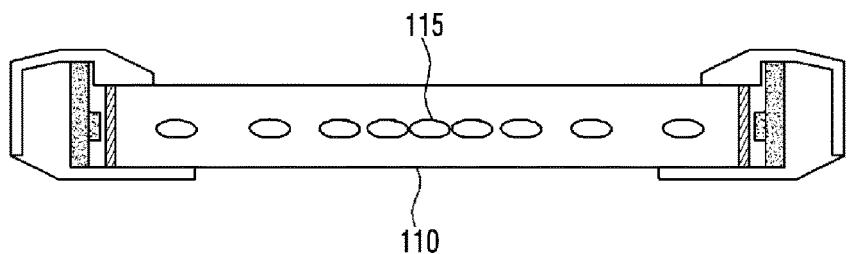
FIG. 8 is a cross sectional view showing a fifth embodiment of the light guide plate.

FIG. 8 is a cross sectional view showing a fifth embodiment of the light guide plate.

Referring to FIG. 8, the interval between the predetermined patterns 115 is not regular. That is, the density of the pattern 115 is not constant. Specifically, the density of the pattern 115 becomes greater the closer it is to a central portion from both sides of the light guide plate 110. In other words, an interval between the adjacent patterns 115 becomes less the closer it is to the central portion of the light guide plate 110. The top and the bottom surfaces of the light guide plate 110 of a lighting module having such a pattern 115 may show a predetermined light distribution characteristic.

Meanwhile, though not shown in the drawings, the patterns shown in FIGS. 5 to 7 can also have the structure shown in FIG. 8.

Referring back to FIGS. 1 to 2, the light guide plate 110 may have a predetermined pattern. Here, the predetermined pattern may be disposed on the top surface or the bottom surface of the light guide plate 110. This will be described in detail with reference to FIGS. 9 to 12.

Figure 9:
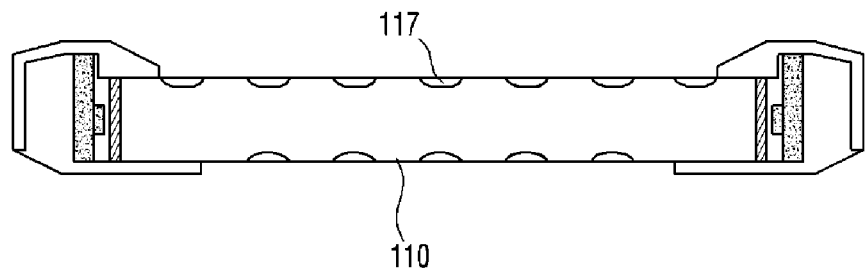
FIG. 9 is a cross sectional view showing a sixth embodiment of the light guide plate.
Figure 10:
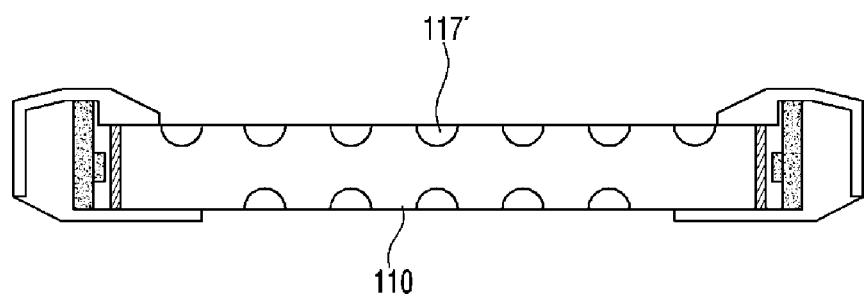
FIG. 10 is a cross sectional view showing a seventh embodiment of the light guide plate.
Figure 11:
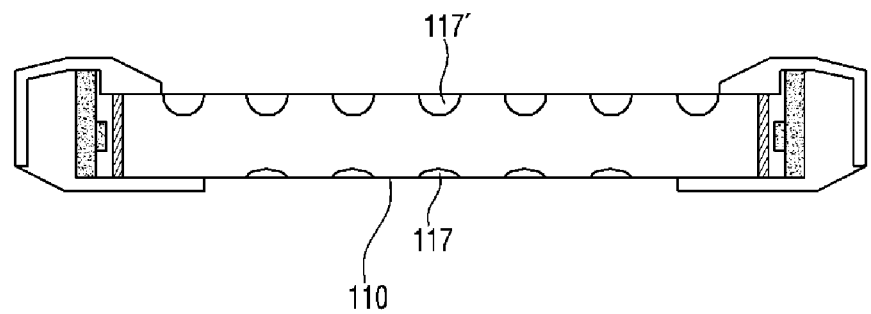
FIG. 11 is a cross sectional view showing an eighth embodiment of the light guide plate.
Figure 12:
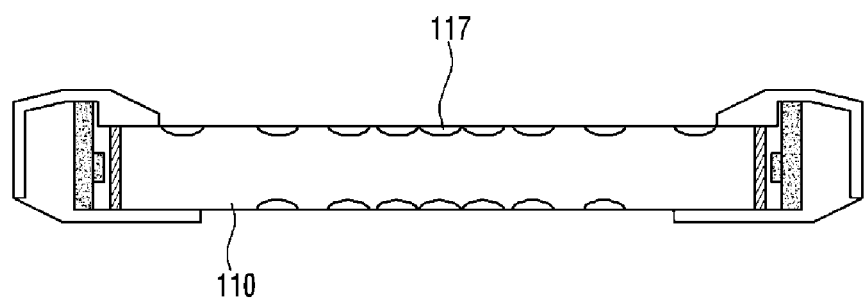
FIG. 12 is a cross sectional view showing a ninth embodiment of the light guide plate.

FIG. 9 is a cross sectional view showing a sixth embodiment of the light guide plate. FIG. 10 is a cross sectional view showing a seventh embodiment of the light guide plate. FIG. 11 is a cross sectional view showing an eighth embodiment of the light guide plate. FIG. 12 is a cross sectional view showing a ninth embodiment of the light guide plate.

Referring to FIG. 9, a predetermined pattern 117 may be disposed on the top and the bottom surfaces of the light guide plate 110. Here, the predetermined pattern 117 may be disposed only on one of the top and the bottom surfaces of the light guide plate 110.

The predetermined pattern 117 may have, as shown in FIG. 9, a semi-elliptical cross section. Additionally, as shown in FIG. 10, the predetermined pattern 117 may have a hemispherical cross section.

Also, as shown in FIG. 11, the bottom surface of the light guide plate 110 may have a semi-elliptical pattern 117 and the top surface of the light guide plate 110 may have a hemispherical pattern 117'. It is possible to cause the amounts of the lights which are emitted through the top and the bottom surfaces of the light guide plate 110 to be different from each other through the patterns.

Referring back to FIG. 9, the predetermined pattern 117 may be formed on the top surface or the bottom surface of the light guide plate 110 at a regular or irregular interval. This will be described with reference to FIG. 12.

FIG. 12 is a cross sectional view of another embodiment of the lighting module shown in FIG. 9.

Referring to FIG. 12, the interval between the predetermined patterns 117 is not regular. That is to say, the density of the pattern 117 is not constant. Specifically, the density of the pattern 117 becomes greater the closer it is to a central portion from both sides of the light guide plate 110. In other words, an interval between the adjacent patterns 117 becomes less the closer it is to the central portion of the light guide plate 110. The top and the bottom surfaces of a lighting module having such a pattern 117 may show a predetermined light distribution characteristic.

Meanwhile, though not shown in the drawings, the patterns shown in FIGS. 10 to 11 can also have the structure shown in FIG. 12.

Referring back to FIG. 2, the lighting module according to the embodiment may further include a first and a second phosphor luminescent films 170*a* and 170*b*.

The first phosphor luminescent film 170*a* is disposed between the light guide plate 110 and the first light source 130*a*. The second phosphor luminescent film 170*b* is disposed between the light guide plate 110 and the second light source 130*b*.

The first and the second phosphor luminescent films 170*a* and 170*b* may emit light with a wavelength different from that of the light emitted from the first and the second light sources 150*a* and 150*b*.

The first and the second phosphor luminescent films 170*a* and 170*b* may include a transparent resin and a fluorescent material contained within the transparent resin. The fluorescent material of the first phosphor luminescent film 170*a* may be the same as or different from the fluorescent material of the second phosphor luminescent film 170*b*. The fluorescent material is excited by the light from the first and the second light sources 130*a* and 130*b* and is able to emit light with a wavelength different from that of the light from the first and the second light sources 130*a* and 130*b*. The fluorescent material may be at least one of a yellow fluorescent material, a red fluorescent material and a green fluorescent material.

A curing agent or an additive may be included within the transparent resins of the first and the second phosphor luminescent films 170a and 170b. The curing agent cures the transparent resin. The additive uniformly disperses the fluorescent material within the transparent resin. The transparent resin may include a diffusion material. The diffusion material is able to improve an excitation ratio of the fluorescent material by improving the refraction of light.

Though not shown in the drawings, the lighting module according to the embodiment may further include a diffuser plate. The diffuser plate diffuses light which is emitted from the light guide plate 110. Through use of the diffuser plate, light spot can be removed. In this case, the diffuser plate is disposed on at least one of the top and the bottom surfaces of the light guide plate 110. Both sides of the diffuser plate may be inserted into the first case 150A and the second case 150B respectively.

Figure 13:
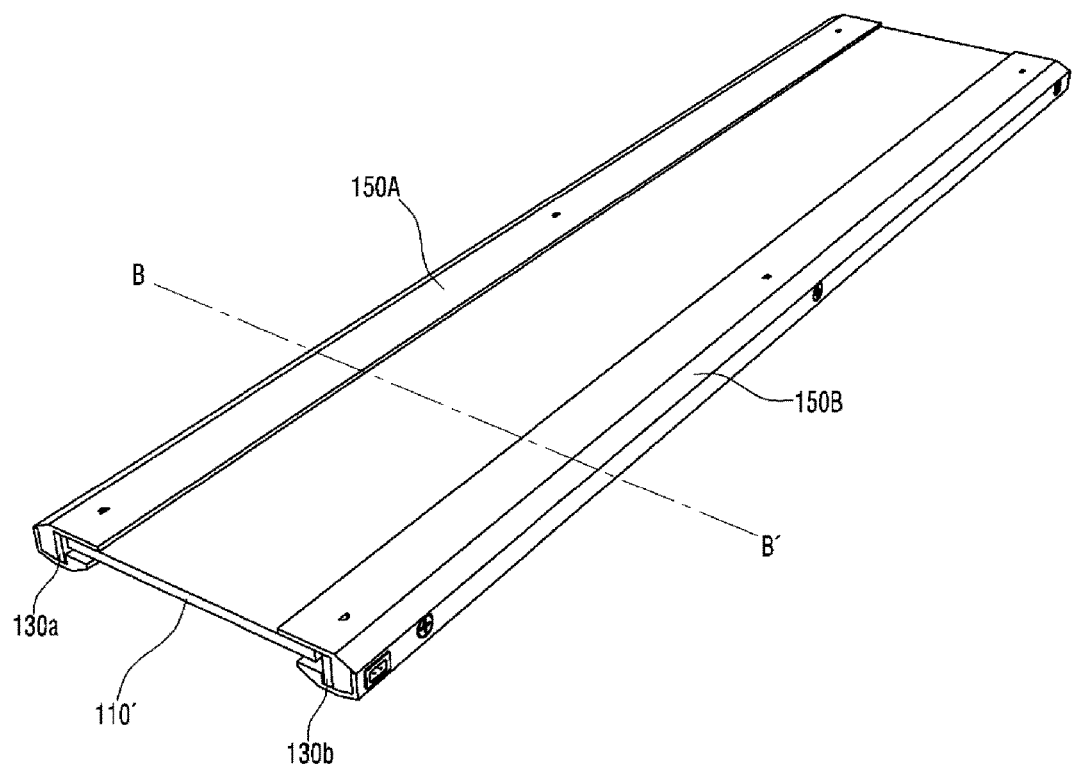
FIG. 13 is a perspective view of a lighting module according to another embodiment.
Figure 14:
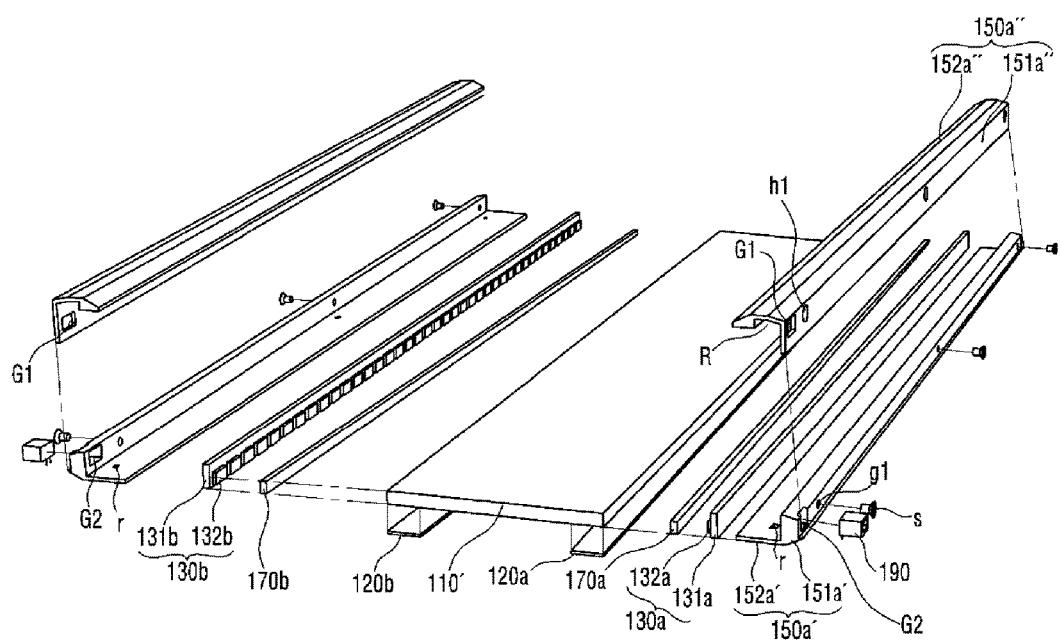
FIG. 14 is an exploded perspective view of the lighting module shown in FIG. 13.
Figure 15:
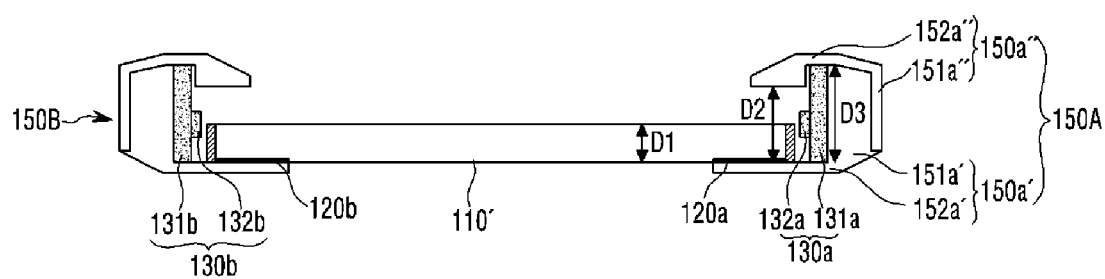
FIG. 15 is a cross sectional view of the lighting module shown in FIG. 13 taken along line B-B'.

FIG. 13 is a perspective view of a lighting module according to further another embodiment. FIG. 14 is an exploded perspective view of the lighting module shown in FIG. 13. FIG. 15 is a cross sectional view of the lighting module shown in FIG. 13 taken along line B-B'.

In description of elements of the lighting modules shown in FIGS. 13 to 15, the same reference numerals as those of the lighting modules shown in FIGS. 1 to 2 are assigned to the same elements as those of the lighting modules shown in FIGS. 1 to 2. Description thereabout is replaced by the foregoing description.

Referring to FIGS. 13 to 15, a lighting module 100 includes a light guide plate 110', a first light source 130a, a second light source 130b, a first case 150A and a second case 150B.

The light guide plate 110' is disposed between the first light source 130a and the second light source 130b both of which are disposed opposite to each other.

The light guide plate 110' may have a rectangular parallelepiped shape. The first light source 130a is disposed above one side of the plate-shaped light guide plate 110'. The second light source 130b is disposed above the other side opposite to the one side of the light guide plate 110'.

The one side of the light guide plate 110' is disposed above a portion of a light emitting device 132a of the first light source 130a and not disposed above the other portion of the light emitting device 132a.

A thickness "D1" of the light guide plate 110' is less than an interval "D2" between an extension part 152a" of an upper case 150a" and an extension part 152a' of a lower case 150a'. That is, the thickness "D1" is less than the thickness of the light guide plate 110 shown in FIGS. 1 to 2. Since "D1" is less than "D2", a part of light emitted from the light emitting device 132a of the first light source 130a is directly emitted outward without being incident on one side of the light guide plate 130'.

The thickness "D1" of the light guide plate 110' is less than a width "D3" of a substrate 131a of the first light source 130a. Specifically, the thickness "D1" of the light guide plate 110' may be half as much as the width "D3" of the substrate 131a of the first light source 130a. In this case, the top surface of the light guide plate 110' may be on a line passing through the center of the light emitting device 132a. Accordingly, a half of light which is emitted from the light emitting device 132a is incident on one side of the light guide 110' and the rest of the light is emitted outward. Since an amount of the light which is emitted above the top surface of the light guide plate 110' is different from an amount the light which is emitted below the bottom surface of the light guide plate 110', the amounts of the lights which are emitted upward and downward from the lighting module according to the embodiment may be different from each other. The amount of light which is emitted above the top surface of the light guide plate 110' may be a sum of the amount of the light which is emitted from the top surface of the light guide plate 110' and the amount of light which is emitted from the light emitting device 132a and is directly emitted outward without being incident on the light guide plate 110'.

The one side including one lateral surface of the light guide plate 110' is coupled to the first case 150A. The other side including the other lateral surface of the light guide plate 110' is coupled to the second case 150B.

One side of the light guide plate 110' is coupled to the first case 150A, the bottom surface of the light guide plate 110' is fixed to the lower case 150a' of the first case 150A.

When the bottom surface of the light guide plate 110' is coupled to the lower case 150a', an adhesive sheet 120 may be disposed between the light guide plate 110' and the lower case 150a'.

The adhesive sheet 120 is disposed between the light guide plate 110' and the lower case 150a' and securely couples the light guide plate 110' to the lower case 150a'. Here, the light guide plate 110' and the lower case 150a' may be securely coupled to each other by using a fastener such as a screw "S" instead of the adhesive sheet 120.

The material of the of the light guide plate 110' may be polyethylene terephthlate (PET), poly carbonate (PC), cycloolefin copolymer (COC) and polyethylene naphthalate (PEN) and an acrylic resin like polymethyl metaacrylate (PMMA) and the like in consideration of thermal expansion depending on a temperature in use of the material.

The light guide plate 110' may include a predetermined pattern. The predetermined pattern may be disposed within the light guide plate 110'. This will be described in detail with reference to FIGS. 16 to 17.

Figure 16:
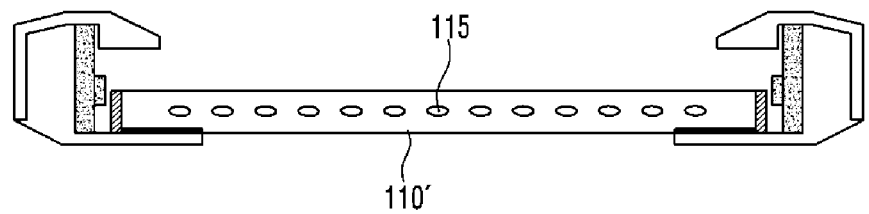
FIG. 16 is a cross sectional view showing the lighting module shown in FIG. 13 to which a light guide plate including the pattern of the light guide plate shown in FIG. 4 has been applied.
Figure 17:
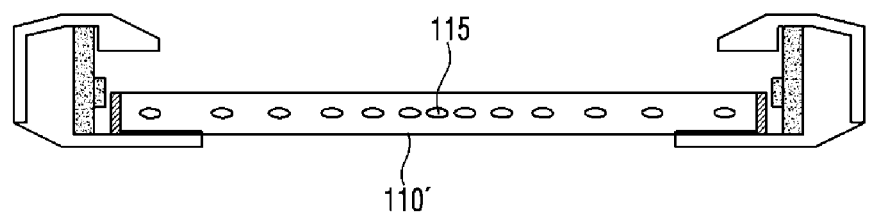
FIG. 17 is a cross sectional view showing the lighting module shown in FIG. 13 to which a light guide plate including the pattern of the light guide plate shown in FIG. 8 has been applied.

FIG. 16 is a cross sectional view showing the lighting module shown in FIG. 13 to which a light guide plate including the pattern of the light guide plate shown in FIG. 4 has been applied. FIG. 17 is a cross sectional view showing the lighting module shown in FIG. 13 to which a light guide plate including the pattern of the light guide plate shown in FIG. 8 has been applied.

Referring to FIG. 16, the light guide plate 110' includes a predetermined pattern 115 therewithin.

The predetermined pattern 115 may be formed within the light guide plate 110' by using a laser processing method. The predetermined pattern 115 may have a shape with an empty interior.

A plurality of the predetermined patterns 115 may be provided.

The plurality of the predetermined patterns 115 may have the same type and may be disposed within the light guide plate 110'. Particularly, the plurality of the predetermined patterns 115 may be disposed in an inner central portion of the light guide plate 110' in a row or in a plurality of rows. In this case, the light from the first light source and the second light source may be emitted through the top and the bottom surfaces of the light guide plate 110' at the same ratio.

The plurality of the patterns 115 may be disposed closer to one of the top and the bottom surfaces of the light guide plate 110'. When the patterns 115 are disposed closer to one of the top and the bottom surfaces, an amount of the light which is emitted through the top surface of the light guide plate 110 can be controlled to be different from an amount of the light which is emitted through the bottom surface.

The cross section of the predetermined pattern 115 may have an elliptical shape. Moreover, the predetermined pattern 115 may have shapes shown in FIGS. 5 to 7.

Referring to FIG. 16, an interval between the predetermined patterns 115 may be regular. In other words, a density of the pattern 115 may be constant. Additionally, the interval between the predetermined patterns 115 may not be regular. That is, the density of the pattern 115 may not be constant. This will be described with reference to FIG. 17.

Referring to FIG. 17, the interval between the predetermined patterns 115 is not regular. That is, the density of the pattern 115 is not constant. Specifically, the density of the pattern 115 becomes greater the closer it is to a central portion from both sides of the light guide plate 110'. In other words, an interval between the adjacent patterns 115 becomes less the closer it is to the central portion of the light guide plate 110'. The top and the bottom surfaces of the light guide plate 110' of a lighting module having such a pattern 115 may show a predetermined light distribution characteristic.

Figure 18:
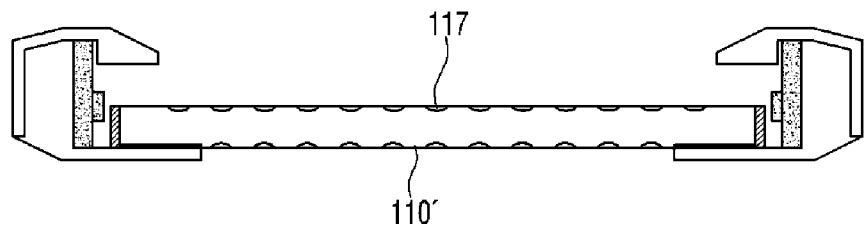
FIG. 18 is a cross sectional view showing the lighting module shown in FIG. 13 to which a light guide plate including the pattern of the light guide plate shown in FIG. 9 has been applied.
Figure 19:
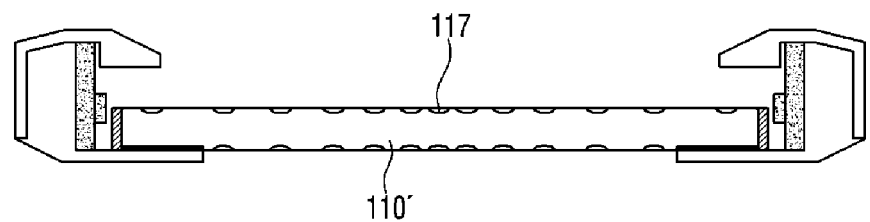
FIG. 19 is a cross sectional view showing the lighting module shown in FIG. 13 to which a light guide plate including the pattern of the light guide plate shown in FIG. 12 has been applied.

FIG. 18 is a cross sectional view showing the lighting module shown in FIG. 13 to which a light guide plate including the pattern of the light guide plate shown in FIG. 9 has been applied. FIG. 19 is a cross sectional view showing the lighting module shown in FIG. 13 to which a light guide plate including the pattern of the light guide plate shown in FIG. 12 has been applied.

Referring to FIGS. 18 to 19, the light guide plate 110' may have a predetermined pattern 117. The predetermined pattern 117 may be disposed on the top surface or the bottom surface of the light guide plate 110'. Here, the predetermined pattern 117 may be disposed only on one of the top and the bottom surfaces of the light guide plate 110'.

The predetermined pattern 117 has a semi-elliptical cross section. However, the cross section of the predetermined pattern 117 is not limited to this. The predetermined pattern 117 may have a hemispherical cross section, a polygonal cross section and a slot shaped cross section. The predetermined pattern 117 may also simultaneously have both the semi-elliptical cross section and the hemispherical cross section. That is, a plurality of the hemispherical patterns may be disposed on the top surface of the light guide plate 110' and a plurality of the semi-elliptical patterns may be disposed on the bottom surface of the light guide plate 110'. It is possible to cause the amounts of the lights which are emitted through the top and the bottom surfaces of the light guide plate 110' to be different from each other through the patterns.

Referring to FIG. 19, the interval between the predetermined patterns 117 is not regular. That is to say, the density of the pattern 117 is not constant. Specifically, the density of the pattern 117 becomes greater the closer it is to a central portion from both sides of the light guide plate 110'. In other words, an interval between the adjacent patterns 117 becomes less the closer it is to the central portion of the light guide plate 110'.

Figure 20:
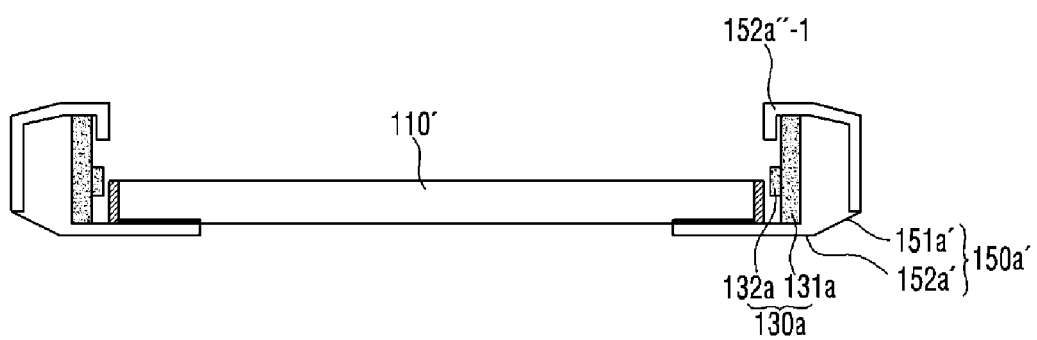
FIG. 20 is a cross sectional view showing another example of the lighting module shown in FIG. 13.

FIG. 20 is a cross sectional view showing another example of the lighting module shown in FIG. 13.

An extension part 152a"-1 shown in FIG. 20 has a shape different from the extension part 152a" shown in FIGS. 13 to 15.

Specifically, the extension part 152a"-1 shown in FIG. 20 is not disposed above the top surface of the light guide plate 110' and supports one side of the substrate 131a of the first light source 130a. Here, the end of the extension part 152a"-1 may be bent in the direction of the extension part 152a' of the lower case 150a' lest the first light source 130a should move. For example, in order that the first light source 130a is not inclined toward the top surface of the light guide plate 110', the end of the extension part 152a"-1 may be bent in the direction of the extension part 152a' of the lower case 150a'.

The following Table 1 shows a specification of the lighting modules according to the embodiment shown in FIGS. 1 to 13.

TABLE 1

| Product | Item | | Value |
|---|---|---|---|
| Strip Spce. (13S * 5P) | Voltage(V) | | 39 |
| | Current(mA) | | 350 |
| | Power(W) | | 13.65 |
| Module Spec. | Total Lumen output(lm) | Up Lumen Output | 2,500 500 |
| | | Down Lumen Output | 2,000 |
| | Module Power(W) | | 27.3 |
| | Efficacy(lm/W) | | 90 |
| | CCT(K) | | 4,000 |
| | CRI | | 80 |
| Fixture Spec. | Lumen Output(lm) | | 10,000(Up-Down: 2,000-8,000) |
| | DC Power Consumption(W) | | 110 |

Referring to Table 1, in the lighting modules shown in FIGS. 1 to 13, an up lumen output is less than a down lumen output. Contrary to this, the up lumen output may be greater than the down lumen output. For example, a ratio of the down lumen output to the up lumen output maybe from 6:4 to 8:2.

Meanwhile, a value of width W (mm)×height H (mm)× length L (mm) of the lighting modules shown in FIGS. 1 to 12 may be either 80×12×560 or 45×12×560.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A lighting module, comprising:
    a light guide plate comprising a top surface and a bottom surface, wherein the light guide plate is configured to emit a first light upward from the top surface and a second light downward from the bottom surface;
    a first case covering one side of the light guide plate;

a second case covering another side of the light guide plate;

a first light source which is disposed in the first case and is configured to emit light to the one side of the light guide plate; and a second light source which is disposed in the second case and is configured to emit light to the other side of the light guide plate, wherein the first light passes through a first opening disposed on the top surface of the light guide plate and disposed between the first case and the second case, wherein the second light passes through a second opening disposed under the bottom surface of the light guide plate and disposed between the first case and the second case, and wherein a size of the first opening is different from a size of the second opening.

2. The lighting module of claim 1, wherein a ratio of a lumen output of the first light to a lumen output of the second light is from 6:4 to 8:2.

3. The lighting module of claim 1, wherein an amount of the first light is different from an amount of the second light.

4. The lighting module of claim 1, wherein a shape of the first opening and the second opening is a square.

5. The lighting module of claim 1, wherein the light guide plate comprises a plurality of the patterns disposed within the light guide plate.

6. The lighting module of claim 5, wherein the plurality of the patterns are disposed closer to at least one of the top surface and the bottom surface of the light guide plate.

7. The lighting module of claim 1, wherein the light guide plate includes a plurality of patterns disposed on at least one of the top and the bottom surfaces of the light guide plate.

8. The lighting module of claim 1, further comprising a first phosphor luminescent film disposed between the light guide plate and the first light source.

9. The lighting module of claim 1, wherein the first light source comprises a substrate and a plurality of light emitting devices disposed on the substrate, and wherein a thickness of the light guide plate is less than a thickness of the substrate.

10. The lighting module of claim 1,
wherein the first case comprises a base on which the first light source is disposed and first and second extension parts which extend from both ends of the base respectively,
wherein the first extension part is disposed under the bottom surface of the light guide plate and the second extension part is disposed on the top surface of the light guide plate, and
wherein a length of the first extension part is different from a length of the second extension part.

11. The lighting module of claim 1,
wherein the first case comprises a lower case and an upper case,
wherein the lower case comprises a first base on which the first light source is disposed, and a first extension part extending from one side edge of the first base in a direction perpendicular to an inner surface of the first base, and
wherein the upper case comprises a second base on which the first base of the lower case is disposed, and a second extension part extending from one side edge of the second base in a direction perpendicular to an inner surface of the second base.

12. A lighting module, comprising:
a light guide plate comprising a top surface and a bottom surface, wherein the light guide plate is configured to emit a first light upward from the top surface and a second light downward from the bottom surface;
a case covering at least parts of the top surface and the bottom surface of the light guide plate; and
a light source which is disposed in the case and is configured to emit light to both sides of the light guide plate,
wherein the lighting module is configured to emit the first light upward from the top surface of the light guide plate, and the second light downward from the bottom surface of the light guide plate, and
wherein an outside exposure area of the top surface of the light guide plate is different from an outside exposure area of the bottom surface of the light guide plate.

13. The lighting module of claim 12, wherein a ratio of a lumen output of the first light to a lumen output of the second light is from 6:4 to 8:2.

14. The lighting module of claim 12, wherein an amount of the first light is different from an amount of the second light.

15. The lighting module of claim 12,
wherein the case comprises a base on which the light source is disposed and a first and second extension parts which extend from both ends of the base respectively,
wherein the first extension part is disposed under the bottom surface of the light guide plate and the second extension part is disposed on the top surface of the light guide plate, and
wherein a length of the first extension part is different from a length of the second extension part.

16. The lighting module of claim 15, wherein a thickness of the light guide plate is less than an interval between the first extension part and the second extension part.

17. The lighting module of claim 12, wherein the light guide plate comprises a plurality of patterns disposed within the light guide plate.

18. The lighting module of claim 12, wherein the light guide plate includes a plurality of patterns disposed on at least one of the top and the bottom surfaces of the light guide plate.

19. The lighting module of claim 12, further comprising a phosphor luminescent film disposed between the light guide plate and the light source.

20. The lighting module of claim 12,
wherein the case comprises a lower case and an upper case,
wherein the lower case comprises a first base on which the light source is disposed, and a first extension part extending from one side edge of the first base in a direction perpendicular to an inner surface of the first base, and
wherein the upper case comprises a second base on which the first base of the lower case is disposed, and a second extension part extending from one side edge of the second base in a direction perpendicular to an inner surface of the second base.

* * * * *